United States Patent Office 3,544,583
Patented Dec. 1, 1970

3,544,583
CYCLOALIPHATIC MONO (NITRILE SULFITES)
Emmett H. Burk, Jr., Glenwood, Ill., and Donald D. Carlos, Crown Point, Ind., assignors to Atlantic Richfield Company, a corporation of Pennsylvania
No Drawing. Continuation-in-part of application Ser. No. 660,242, Aug. 14, 1967. This application Nov. 27, 1968, Ser. No. 779,620
Int. Cl. C07d 95/00
U.S. Cl. 260—301
9 Claims

ABSTRACT OF THE DISCLOSURE

Compounds of the formula

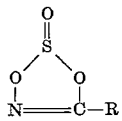

wherein R is a cycloaliphatic radical are prepared by reacting the corresponding hydroxamic acids with thionyl chloride. The compounds are useful as, inter alia, isocyanate generators and have the advantage over conventional cycloaliphatic isocyanates in that they can be easily handled and stored.

---

This application is a continuation-in-part of abandoned application Ser. No. 660,242, filed Aug. 14, 1967, which latter application is in turn a continuation-in-part of abandoned application Ser. No. 502,604, filed Oct. 22, 1965.

The present invention is directed to a new class of organic compounds. More specifically, the invention is directed to cycloaliphatic mono(nitrile sulfites) which can be represented by the following structure.

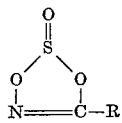

wherein R is a cycloaliphatic hydrocarbon of 5 to about 30, or even about 50, carbon atoms, preferably 5 to about 15 carbon atoms. The cycloaliphatic hydrocarbon R can be saturated or ethylenically or acetylenically unsaturated, and is preferably cycloalkyl. Where R is polycyclic, the rings can be formed by either a bridged ring system or a spiro ring system or both. Most often, R will be either monocyclic or will possess only a bridged ring system, as, for example, in Decalin. If desired, R can contain ring substituents such as, for instance, one or more, say 1 to 3, halo (preferably chloro, bromo or fluoro), nitro, alkyl or alkoxy groups, which alkyl and alkoxy groups contain 1 to about 20, preferably 1 to about 10, carbon atoms. Since a highly advantageous property of the compounds of the invention is that they can be thermally decomposed to monoisocyanates (RNCO), the R group in the above structure contains no hydrogen reactive with isocyanate.

The cycloaliphatic mono(nitrile sulfites) of the present invention are valuable intermediates or precursors for the preparation of highly desired chemicals. For example, as mentioned above, the cycloaliphatic mono(nitrile sulfites) can be thermally decomposed to monoisocyanates. Monoisocyanates can be used in the preparation of urethanes, ureido compounds, and other derivatives of various active hydrogen-containing compounds.

The cycloaliphatic mono(nitrile sulfites) can also be hydrolyzed with basic materials to the respective amines or acid hydrolyzed to cycloaliphatic hydroxamic acids.

Decomposition of the cycloaliphatic mono(nitrile sulfites) to the corresponding cycloaliphatic monoisocyanates can be effected by heating the cycloaliphatic mono(nitrile sulfite) to a temperature below the degradation point of the desire cycloaliphatic monoisocyanate product. Since the decomposition reaction is exothermic there may be a tendency for the reaction temperature to run away. Means for carrying away or absorbing heat may be used, therefore, to control the temperature below the degradation point of the desired cycloaliphatic isocyanate product. The temperature employed will vary, of course, depending upon the decomposition temperature of the feed and degradation temperature of the particular cycloaliphatic monoisocyanates being prepared. In most cases, however, the temperature will usually fall in the range of about 50 to 200° C., preferably about 75 to 150° C. Advantageously, the decomposition is conducted in the presence of an inert solvent such as benzene, xylene, toluene, chlorobenzene and the like or in excess thionyl chloride.

The ability of the cycloaliphatic mono(nitrile sulfites) of the invention to generate isocyanates upon heating provides an additional advantage in that the cycloaliphatic mono(nitrile sulfites) of the invention, in contrast to isocyanates, are stable in the absence of water and therefore can be easily handled and stored. Also, since there is no active hydrogen (e.g. in the form of HCl) present in the cycloaliphatic mono(nitrile sulfites) of the invention, or in the decomposition products formed, to react with the isocyanate when the latter is made, use of the cycloaliphatic mono(nitrile sulfites) for the production of monoisocyanates provides a method that does not suffer from the reduced yields and separation and purification problems presented by the by-products obtained from starting materials of commercial methods wherein active hydrogen is present. Use of the cycloaliphatic mono(nitrile sulfites) in the preparation of isocyanates, furthermore, provides a process having advantages over commercial methods employing azides in that the former do not have the explosion tendencies of the latter and are more economical.

The cycloaliphatic mono(nitrile sulfites) of the invention can be prepared by reacting a cycloaliphatic monohydroxamic acid and thionyl chloride. Cycloaliphatic monohydroxamic acids which react with thionyl chloride to produce the novel compounds of the invention can be represented by the structure:

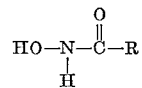

wherein R is as defined above in the structure of the cycloaliphatic mono(nitrile sulfites) of the invention.

Illustrative of cycloaliphatic monohydroxamic acids suitable for use as the reactant in the preparation of the cycloaliphatic mono(nitrile sulfites) of the invention are the following: monocycloaliphatic hydroxamic acids, such as cyclopentylhydroxamic acid,
cyclohexylhydroxamic acid,
3-methyl-cycloheptylhydroxamic acid,
3-isopentyl-cyclo-octylhydroxamic acid,
4-octyl-cyclo-decylhydroxamic acid,
4-methoxy-2-cyclopentenylhydroxamic acid,
4-cyclohexenylhydroxamic acid,
5-pentadecyl-3-cycloheptenylhydroxamic acid,
3-nitro-4-cyclooctenylhydroxamic acid,
4-chloro-3-cyclodecenylhydroxamic acid,
5-bromo-10-cycloheptadecenylhydroxamic acid,
2,4-cyclopentadienylhydroxamic acid, 2,5-cyclohexadienylhydroxamic acid,
2,4,6-cycloheptatrienylhydroxamic acid,
cyclooctatetraenylhydroxamic acid, etc.;
polycycloaliphatic hydroxamic acids, for instance, of 2 to 5, preferably 2 or 3, hydrocarbon rings, such as, bicyclo [1.1.1.] pent-2-yl-hydroxamic acid,
bicyclo [3.1.0.] hex-3-yl-hydroxamic acid,
2-ethyl-bicyclo [2.2.1.] hept-7-yl-hydroxamic acid,
bicyclo [2.2.2.] oct-2-yl-hydroxamic acid,
bicyclo [2.2.1] hept-5-en-2-yl-hydroxamic acid,
bicyclo [3.2.1.] oct-2,4-dien-7-yl-hydroxamic acid,
1-perhydroanthracene-hydroxamic acid,
2-chloroperhydroanthracen-1-yl-hydroxamic acid,
tricyclo [4.4.1.1$^{1,5}$] dodec-3-yl-hydroxamic acid,
5-dodecyltetracyclo [5.2.2.0$^{3,8}$.0$^{4,11}$] undec-2-yl-hydroxamic acid,
perhydro-1,4-ethanoanthracen-1-yl-hydroxamic acid,
6-tricosylperhydro-1,4-ethano-5,8-methanoanthracen-1-yl-hydroxamic acid,
3-perhydroperylene-hydroxamic acid, etc.

Illustrative examples of cycloaliphatic mono(nitrile sulfites) of the present invention include:

cyclopentyl mono (nitrile sulfite),
cyclodecyl mono(nitrile sulfite),
cyclopentadecyl mono(nitrile sulfite),
cycloheptadecyl mono(nitrile sulfite),
cyclotetraconyl mono(nitrile sulfite),
cyclooctacosyl mono(nitrile sulfite),
cyclotriacontyl mono(nitrile sulfite),
2-methylcycloheptyl mono(nitrile sulfite),
4-fluorocyclohexyl mono(nitrile sulfite),
2-ethoxy-cyclooctyl mono(nitrile sulfite),
2-isopentoxy-cyclononyl mono(nitrile sulfite),
3-chloro-cyclodecyl mono(nitrile sulfite),
α-Decalin mono(nitrile sulfite),
β-Decalin mono(nitrile sulfite),
2-bromo-heptalen-1-yl-mono(nitrile sulfite),
2-nitrotetral-1-yl-mono(nitrile sulfite),
4-cerene-mono(nitrile sulfite),
2-perhydro-anthracene-mono(nitrile sulfite),
1,2-dimethyl-5-phenyl perhydrochrysen-3-yl-mono (nitrile sulfite),
2-perhydropentacene-mono(nitrile sulfite), etc.

The temperature for effecting the reaction of the cycloaliphatic monohydroxamic acid and thionyl chloride may vary depending upon the particular cycloaliphatic hydroxamic acid selected but in all cases should be conducted below the decomposition temperature of the desired cycloaliphatic mono(nitrile sulfite). Reflux temperatures can also be used as long as the reflux temperature of the particular mixture is below the decomposition temperature of the corresponding cycloaliphatic mono(nitrile sulfite) produced. The reaction temperature will usually fall in the range of up to about 90° C. often up to about 70° C., preferably up to about 30° C. The reaction can be successfully run at temperatures as low as about minus 30° C. Ordinarily the reaction will proceed readily at atmospheric pressure but sub- and superatmospheric pressure can be employed if desired.

Either the cycloaliphatic hydroxamic acid reactant or the thionyl chloride reactant can be in excess but it is preferred that at least a stoichiometric amount of thionyl chloride be used, that is, a ratio of at least one mole of thionyl chloride per hydroxamic acid substituent.

The reaction is conducted in the liquid phase and in many cases the cycloaliphatic monohydroxamic acid will react from the solid state. Advantageously, the cycloaliphatic monohydroxamic acid is first dissolved or slurried in an oxygen-containing organic solvent. Illustrative of suitable oxygen-containing solvents are the thionyl chloride reactant itself and normally liquid organic ethers, esters, furans, dioxanes and the like. The preferred solvent is the thionyl chloride reactant, an excess of which in most cases will partially dissolve the cycloaliphatic monohydroxamic acid.

The reaction is often over in less than about 0.5 hour, for example, 15 minutes, or in about 5 to 20 hours, depending upon the reaction temperature employed and is marked by a cessation in hydrogen chloride gas evolution. Normally, at least about 0.5 hour is required for the reaction to go to completion at temperatures which minimize side reactions. The reaction is usually quite rapid once the cycloaliphatic monohydroxamic acid is dissolved. At the lower reaction temperatures the cycloaliphatic monohydroxamic acid is generally slow to dissolve and may even come out of solution, go back into solution, etc. during the reaction.

The cycloaliphatic mono(nitrile sulfite) can be recovered from the resulting solution by any desirable means, for instance, by first filtering the resulting solution to remove any unreacted starting materials and subjecting the filtrate to reduced pressure to remove unreacted thionyl chloride and inert solvent, if employed, and provide the cycloaliphatic mono(nitrile sulfite) as a crude product. Alternately, prior to the filtering step, the solution can be cooled to crystallize out the product and recovered as described. The crude product, which can be either crystalline or liquid depending on the particular cycloaliphatic mono(nitrile sulfite) prepared, contains small amounts of impurities high in chlorine content. A purer product can be obtained by recrystallization techniques as, for instance, from a suitable solvent such as dichloromethane, carbon disulfide, ethyl acetate, thionyl chloride, and the like, or mixtures thereof.

A convenient alternative method for obtaining an essentially chlorine-free cycloaliphatic mono(nitrile sulfite) is by extraction or washing with a hydrocarbon solvent. Any normally liquid hydrocarbon solvent can be used for the extraction as, for instance, alkanes of 5 to 15 or more carbon atoms, aromatic solvents such as benzene, xylenes, toluene, chlorobenzene and the like. A minimum amount of solvent is employed in the extraction, the actual amount used being dependent upon the particular cycloaliphatic mono(nitrile sulfite) feed selected. If desired, a combination of both the recrystallization and extract methods can be used to obtain essentially chlorine-free cycloaliphatic mono(nitrile sulfite). Thermal decomposition of the essentially chlorine-free feed results in improved yields of a purer monoisocyanate product, which is also essentially chlorine-free.

The following examples will serve to illustrate the present invention but are not to be construed as limiting.

EXAMPLE I 14.3 g. (0.10 mole) of cyclohexylhydroxamic acid and 198 g. (1.66 moles) of thionyl chloride and 200 cc. diethyl ether are added to a 500 cc. fluted, round bottom flask equipped with a reflux condenser attached to a $CaCl_2$ drying tube. The reaction mixture is stirred mechanically and heated at reflux for two hours. The resulting solution is filtered and the unreacted thionyl chloride and ether are removed under reduced pressure to obtain cyclohexyl mono(nitrile sulfite).

EXAMPLE II

To a 300 cc. fluted, round bottom flask equipped with a reflux condenser attached to a $CaCl_2$ drying tube are added 9.8 g. of β-Decalin hydroxamic acid and 121 g. of thionyl chloride. The reaction mixture is stirred mechanically and heated to reflux for two hours. The resulting solution is filtered and the thionyl chloride removed under reduced pressure to obtain β-Decalin mono(nitrile sulfite) product containing small amounts of impurities. Recrystallization from dichloromethane gives chlorine-free β-Decalin mono(nitrile sulfite).

EXAMPLES III–V

In accordance with the procedure of the above examples, 34.6 (0.20 mole) p-methoxycyclohexylhydroxamic acid is treated with 198 g. (1.66 moles) of thionyl chloride for 3 hours at 0° C. There results a quantitative yield of p-methoxycyclohexyl mono(nitrile sulfite). Similarly p-nitrocyclohexyl mono(nitrile sulfite) can be made from 9.4 g. of p-nitrocyclohexylhydroxamic acid and 99 g. of thionyl chloride, and 2,4-dichlorocyclohexyl mono(nitrile sulfite) can be made from 10.4 g. of 2,4-dichlorocyclohexylhydroxamic acid and 99 g. of thionyl chloride.

It is claimed:

1. Cyclic nitrile sulfite group-containing compounds having the structure:

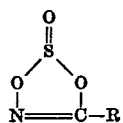

wherein R is saturated, has 5 to about 15 carbon atoms and is selected from the group consisting of (A) cycloaliphatic hydrocarbon of 1 ring or 2 bridged rings and (B) cycloaliphatic hydrocarbon of 1 ring or 2 bridged rings which is ring-substituted with 1 or 2 substituents selected from the group consisting of halo, nitro and alkoxy of 1 to about 10 carbon atoms.

2. The compound of claim 1 wherein R is monocyclic.
3. The compound of claim 1 wherein R is decalyl.
4. β-Decalin mono(nitrile sulfite).
5. A compound of claim 1 wherein R is ring-substituted with 1 or 2 substituents selected from the group consisting of halo, nitro and alkoxy of 1 to about 10 carbon atoms.
6. The compound of claim 5 wherein R is monocyclic.
7. Para-methoxycyclohexyl mono(nitrile sulfite).
8. Para-nitrocyclohexyl mono(nitrile sulfite).
9. 2,4-dichlorocyclohexyl mono(nitrile sulfite).

References Cited

UNITED STATES PATENTS

| | | | |
|---|---|---|---|
| 2,448,767 | 9/1948 | Carlson | 260—327 |
| 2,587,641 | 3/1952 | Moersch et al. | 260—327 |
| 2,882,275 | 4/1959 | Meiser et al. | 260—327 |
| 3,053,852 | 9/1962 | Coover et al. | 260—327 |
| 3,086,024 | 4/1963 | Braun et al. | 260—327 |

ALEX MAZEL, Primary Examiner

R. J. GALLAGHER, Asistant Examiner

U.S. Cl. X.R.

260—453, 500.5

Disclaimer 3,544,583.—*Emmett H. Burk, Jr.*, Glenwood, Ill., and *Donald D. Carlos*, Crown Point, Ind. CYCLOALIPHATIC MONO (NITRILE SULFITES). Patent dated Dec. 1, 1970. Disclaimer filed Aug. 28, 1970 by the assignee, *Atlantic Richfield Company*.

Hereby disclaims the terminal portion of the patent subsequent to Sept. 28, 1988.

[*Official Gazette December 14, 1971.*]